United States Patent Office 3,153,548
Patented Oct. 20, 1964

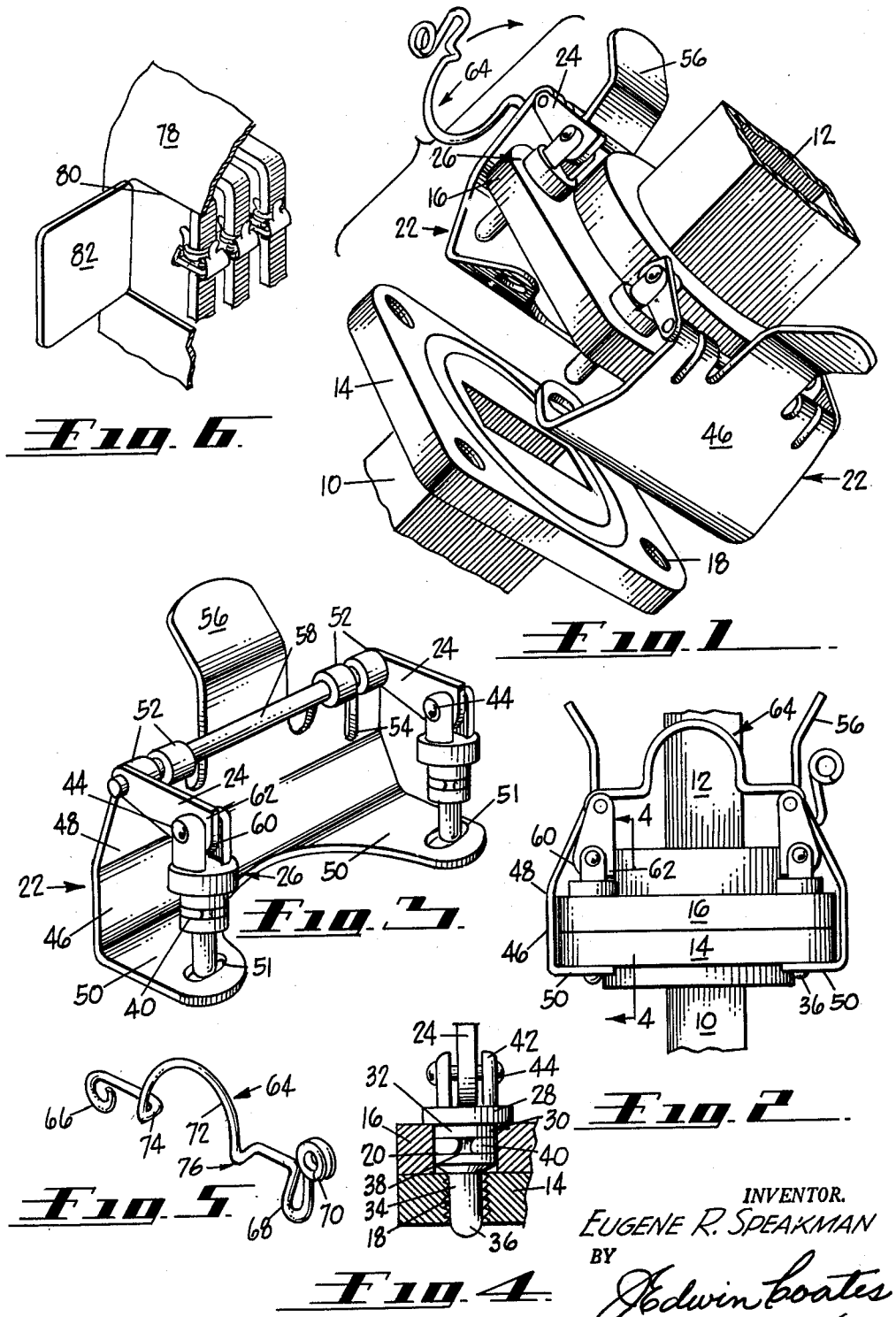

---

3,153,548
QUICK DISCONNECT LATCHING DEVICE
FOR CONDUITS
Eugene R. Speakman, Venice, Calif., assignor to Douglas Aircraft Company, Inc., Santa Monica, Calif.
Filed Oct. 19, 1961, Ser. No. 146,248
10 Claims. (Cl. 285—87)

This invention relates to latching means for connecting a pair of hollow conduit members having mating flanged ends, and is particularly suited for use as a quick-disconnect latching device for connecting two standard wave guide sections. It is so constructed and arranged that it may be attached entirely to one of the sections with no loose parts and it assures quick and proper assembly and disassembly.

The majority of wave guides are made entirely of rigid material. When they are installed in a complex structure and portions of them must extend in different directions it is necessary to make them in relatively short sections with mating flanges which may be secured together to make a unitary article. Even the flexible wave guides are easier to install and remove when made in sections with flanged ends.

Until recently practically all wave guide connections have been made in a standard way. The mating flange of each section is substantially square in planform and provided in each corner with a fastener-receiving aperture arranged in a rectangular pattern with the longitudinal hole spacing about one-sixteenth inch longer than the lateral spacing to insure proper matching of the wave guide conduits. The apertures in one flange are threaded and in the other flange are slightly enlarged to provide clearance for a machine screw. When the apertures are properly lined up, ordinary machine screws are inserted and tightened. This arrangement is simple and highly satisfactory when the work is out in the open but poses problems when installation must be made in relatively inaccessible locations.

Where a wave guide connection must be made within a complex structure like an airplane or missile or within a piece of complex electronic equipment, it is often difficult to hold a screw and guide it into place as well as to apply a screwdriver for tightening it. If it is dropped it frequently falls into a position where it is difficult to recover, and it may interfere with or damage delicate equipment. Moreover, the screws fit rather loosely in the apertures and it is possible to assembly two guide sections ninety degrees out of register and still force the screws into position with a screwdriver, damaging the threads in the process. The mis-registry will, of course, produce an inoperative assembly.

Various attempts have been made in the past to overcome the difficulties mentioned above, but with little or no success. Some of the suggested devices have been difficult to operate and too flimsy to be reliable. Others have been too complex and retained the loose part objection. Some have required parts to be carried on each section and have been so bulky that the guides, when used in groups, must be spaced more widely than desired. Moreover, their weight is excessive.

The present invention overcomes all of the difficulties mentioned above and provides a unit which is very light yet very strong and produces a very high clamping force. Two of the units are securely attached to one of the two sections and have no loose parts to be dropped or lost. They positively guide the second section into proper assembled relation and lock it against any possibility of separation by vibration or shock.

Briefly stated, each of two identical units comprises a latch hook having an inturned portion at its free end to engage the rear face of the flange of one of the sections. A toggle linkage is pivotally carried by the other end of the hook and includes a pivot pin rotatably mounted in bearings on the hook and laterally extending toggle links. The free end of each toggle link is pivotally connected to an anchor pin which passes through one of the apertures in the flange of the section which carries the latching unit. Each pin has a head and a shank section, the latter having a diameter adjacent the head which just fits the clearance aperture in the flange. A spring ring on the shank holds it securely in the aperture but it may be inserted and removed by axial pressure without the use of tools. The free end of the shank is of smaller diameter and fits snugly in the threaded apertures of the other flange, being long enough to extend therebeyond and serve as a detent. When the anchor pins of both units are in place they form a rigid pattern of guides which requires the second flange to be properly oriented before it is assembled.

When the two flanges are matched in assembled relation the inturned portion of the latch hook is engaged behind the remote flange. It is provided with eyes which engage the detent portions of the anchor pins to prevent slippage. The other end of the latch hook is now swung inwardly toward the adjacent wave guide section, forcing its toggle links over-center and clamping the two flanges together with a very high spring force. A resilient locking hook of spring wire is pivotally carried by one of the units and is swung to engage the other unit and lock the entire assembly against any inadvertent separation.

Various other advantages and features of novelty will become apparent as the description proceeds in connection with the presently preferred form of the invention as illustrated in the accompanying drawing in which:

FIGURE 1 is an exploded perspective view of a pair of wave guide sections with two latching devices mounted on one of them;

FIGURE 2 is a side elevational view of the sections of FIGURE 1 in assembled relation and with the latching devices in clamping position;

FIGURE 3 is a perspective view of one complete latching device showing several of the details of construction;

FIGURE 4 is a sectional view taken on line 4—4 of FIGURE 2 showing the fitting of the anchor pin in the conduit flanges;

FIGURE 5 is a perspective view of the resilient locking hook; and

FIGURE 6 is a schematic perspective view illustrating the arrangement of a plurality of wave guides in a supporting structure.

The wave guides to be secured in assembled relation are shown in FIGURE 1 as a pair of conduits or conduit sections 10 and 12 provided respectively with flanges 14 and 16. The flanges are planar on their mating faces and substantially square in planform. Each flange has four fastener-receiving apertures 18 and 20 respectively, arranged in a rectangular pattern, the hole spacing in the longitudinal direction being about one-sixteenth inch longer than in the lateral direction. The conduit sections are rectangular in cross-section and are inoperative if mismatched. The hole pattern in the flanges is provided to protect against such mismatch. Apertures 20 in flange 16 are smooth walled clearance holes and apertures 18 in flange 14 are threaded to receive machine screws passing through holes 20. Since the screws are rather loose in the clearance holes it is possible on occasion to mismatch the hole pattern and still force the screws into position with damage to the threads.

The quick-detachable latching device of this invention comprises a latch hook 22, toggle links 24, and anchor pins 26 projecting snugly through the apertures of both flanges and insuring perfect matching. The anchor pins, which secure and support the assembly on the conduit flange, are identical and each includes a head 28 and a shank 30 having a first section 32 next to the head of a diameter to match the clearance aperture or hole 20 in flange 16 and a second section 34 of smaller diameter to snugly fit in the threaded aperture or hole 18 in flange 14, all as illustrated in FIGURE 4. The tip portion 36 projects beyond flange 14 and serves as a detent.

The larger shank portion 32 is provided intermediate its length with an annular recess or groove 38 in which is loosely mounted a spring ring 40. The normal free diameter of the ring is slightly larger than the diameter of the shank portion or the hole 20. Consequently when an anchor pin is pushed into a hole 20 the ring will resiliently bind in the hole and retain the pin firmly in position, at the same time permitting intentional removal by applying axial pressure.

A clevis 42 is formed on the top of each anchor pin head to receive one end of a toggle link 24. The link is pivotally attached to the clevis by pin 44. The slot in the clevis is wider than the thickness of the toggle link to permit a small amount of lateral movement so that the anchor pins can accommodate the longer or shorter hole spacing.

The latch hook 22 is preferably made of a plate-like member or sheet of strong resilient material, such as stainless steel. The main body 46 is substantially flat but has a slight bend at an intermediate point 48 to clear the flanges, as seen in FIGURE 2, and to furnish some of the resiliency for the toggle action. At its free end an inbent portion forms a pair of ears or a flange 50 which engages the rear face of flange 14 for the clamping operation. Eyes 51 are formed in flange 50 to engage detents 36 and prevent the flange 50 from slipping off the rear face of flange 14. The eyes are elongated in the direction of a line passing through them to accommodate the variable spacing of the anchor pins. The other end of body 46 is curled over to provide a plurality of laterally spaced and aligned pivot bearings 52. A pair of bearings at each lateral end of the body is separated by a slit 54. A central extension of the body in the form of an ear 56 is bent to a convenient shape to serve as a handle for operating the latching device to latch and release it.

A pivot pin 58 extends through all of said bearings and a toggle link 24 is attached to each end of the pin. In manufacture, the two links are arranged to extend inwardly in the same plane and then are secured integral with the pin by flash welding or other means so that the assembly is rigid and the links cannot move individually. With this construction and with the anchor pins secured in the flange 16, the latch hook cannot be cocked in a manner which might cause improper engagement of flange 50 and faulty latching.

It will be noted that the inner ends of toggle links 24 are formed with one rounded corner 60 to permit them to swing freely through more than ninety degrees for outward movement of the latch hook. The other corner is squared off at 62 to provide an abutment to engage the bottom of the clevis slot and limit the over-center swinging of the toggle link to a pre-determined angle of a few degrees. The limitation of movement is very important because the clamping force must be very high, and it would drop off quickly with further over-center movement. The dimensions of all of the parts are carefully selected and very close tolerances are held in manufacture so that no adjustability feature need be provided in the linkage. The standard wave guide flange thicknesses are held to a tolerance of ±.010 inch, and the clamps made with close tolerances are, in effect, pre-adjusted and ready for use with all standard wave guides.

The squared off corners of the toggle links also serve another purpose. It will be seen from FIGURE 2, that the links stop the toggles when the handles 56 are a considerable distance clear of the conduit 12. If flange 50 is properly engaged the handle cannot touch the conduit. If it does touch, this is a signal that the latch hook is not properly engaged or that there is some other defect in the device. Thus there is a built-in safety signal.

In operation, a pair of anchor pins 26 may be inserted in any two adjacent apertures 20 along any of the four sides of flange 16. A second pair of anchor pins is inserted in the opposite two apertures. It will be observed that there are no loose parts and both latching devices are carried entirely on one conduit section. The protruding portions of the pins now form a rigid and exact guide pattern so that flange 14 can be assembled to flange 16 only with the proper orientation. When the flanges are in engagement the latch hooks are swung to a position in which the portions 50 engage the rear face of flange 14 and the eyes 51 engage detents 36 so they cannot slip out of position. Handles 56 are now manipulated to swing the latch hooks in toward the conduit 12 and force toggle links 24 over-center until the abutments 62 engage the bottoms of the clevises 42. The two sections are now securely clamped together.

In order to prevent any possibility of vibration or shock causing the latches to become disengaged a final locking device is provided. A locking hook 64 of high strength spring wire is looped at one end to form an eye 66 with an inside diameter slightly smaller than the diameter of pivot pin 58. It is fitted bindingly on the pin within slit 54 between two of the pivot bearings 52. It will thus remain in any position desired by the operator during actuation of the latching devices. Hook 64 is reversely curved near its other end to form a hook section 68 which passes through a slit 54 on the opposite latch hook, engaging the pivot pin of the latter and locking the two latch hooks against separation. The end portion is again reversely curved and coiled to form a finger grip 70 for actuation.

Since the variation in spacing of apertures 18 and 20 will result in a similar change in spacing of the latch hooks and their pivot pins, the central portion of hook 64 is formed with a high arch 72 to produce substantially the same spring locking force for either spacing. The arch is offset laterally at 74, 76 so that it will clear the wall of conduit 12 when in locking position.

The combination and arrangement of parts described above produces a particularly strong, durable, and trouble-free latching device. So far as is known, this is the only quick-detachable latching device for wave guides which has ever passed the aircraft quality tests for resistance to vibration, fatigue, shock, and other detrimental factors encountered in their normal intended use. It is approximately half the size and weight of other quick acting clamps presently available. No tools are required for installation or removal.

No part of the latching device is wider than one edge of a conduit flange. Hence, in a situation where a plurality of wave guides must be installed in a small space, they may be stacked as close together as though no latching means were employed. An example of this is illustrated in FIGURE 6 which shows a structure 78, such as a part of an airplane, with a small access opening 80, closed by door 82. Within the structure are shown three wave guides arranged in parallel and stacked very close together laterally. The latching devices, of the type shown in FIGURES 1 to 5, are readily accessible through the small opening 80.

It will be apparent to those skilled in the art that various changes and modifications may be made in the construction disclosed without departing from the spirit of the invention and it is intended that all such changes and modifications shall be embraced within the scope of the following claims.

I claim:
1. A quick-disconnect latching device for the mating flanges of a pair of conduit members, said flanges having pairs of aligned, fastener-receiving apertures, comprising: a latch hook having a pair of inwardly extending eyes at its free end, the other end being provided with a plurality of laterally spaced and aligned pivot bearings; a pivot pin rotatably carried in said bearings and having a toggle link rigidly extending laterally from each end thereof; and an anchor pin pivotally connected to the end of each toggle link, said pins being longer than the combined thickness of a pair of conduit flanges; said anchor pins being adapted to be removably secured in the apertures of one of the conduit flanges, extending therethrough to serve as guides for the assembly of the second conduit flange and as detents for said latch hook; said latch hook eyes being adapted to engage the detent portions of said anchor pins to complete the toggle; swinging of said toggle links beyond the axes of said anchor pins serving to clamp said conduit flanges in assembled relation.

2. A latching device as claimed in claim 1 in which said latch hook comprises a plate-like member of high strength spring material having inwardly extending flange means at its free end, said eyes consisting of apertures in said flange means.

3. A latching device as claimed in claim 2, said apertures being elongated on a line passing through both of said apertures to accommodate variable spacing between said fastener-receiving apertures.

4. Quick-disconnect latching means for the mating flanges of a pair of conduit members, each of said flanges being substantially square and having pairs of aligned fastener-receiving apertures rectangularly spaced, comprising: a pair of latching devices arranged along opposed edges of said flanges; each of said devices comprising a latch hook, toggle means, and a pair of anchor pins; said anchor pins having heads and shanks, said shanks passing through the pair of apertures along one edge of said flanges and extending beyond said flanges to serve as detents; said toggle means being pivotally connected to the heads of said anchor pins; said latch hook being pivotally connected to said toggle means and having inwardly extending means at its free end to engage said detents and complete the toggle; said latch hooks being swingable toward each other to urge said toggle means over-center to a position for clamping said flanges in assembled relation; and a resilient locking arm pivotally mounted on one of said latch hooks and having a re-curved end to engage the other of said latch hooks to releasably lock them in their clamping position.

5. Latching means as claimed in claim 4 in which said resilient locking arm is substantially arched to accommodate variations in the distance between said latch hooks in their clamping position.

6. A quick-disconnect latching device for the mating flanges of a pair of conduit members, said flanges having pairs of aligned, fastener-receiving apertures, comprising: a latch hook consisting of a plate-like member of high strength spring material having inturned flange means at its free end, a portion of its other end being curled to provide a plurality of laterally spaced and aligned pivot bearings; a pivot pin rotatably carried in said bearings; a toggle link rigidly secured to each end of said pivot pin and extending laterally in the same plane; and a pair of anchor pins each having a head and a shank; a clevis formed on each head; the free end of one of said toggle links being pivotally secured in each clevis; each of said shanks being longer than the combined thickness of a pair of conduit flanges; means to removably secure each anchor pin in one of a pair of spaced apertures in one of said flanges with the shank extending sufficiently to guide the second flange into assembled relationship and to serve as a detent for said latch hook; said inturned flange means being adapted to engage the remote face of the second conduit flange to complete the toggle and clamp the conduit flanges in assembled relation; said inturned flange means being provided with apertures spaced to engage said detents to prevent slippage.

7. A latching device as claimed in claim 6 in which said toggle links and said anchor pin heads are provided with interengaging abutment means to limit the over-center movement of said toggle links.

8. A latching device as claimed in claim 6 in which said anchor pins are laterally movable to accommodate variable spacing between said fastener-receiving apertures.

9. A quick-disconnect latching device for securing together a plurality of plates having pairs of aligned, fastener-receiving apertures near their marginal edges, comprising: a pair of anchor pins, each having a head and a shank, each shank being substantially longer than the combined thickness of said plates with the free end serving as a detent; toggle means pivotally connected to the heads of said pins; and a latch hook pivotally connected to said toggle means, said latch hook having inwardly extending detent engaging means at its free end; said anchor pins being provided with means to removably secure their shanks in one of said plates; said detent engaging means being adapted to engage said detents and complete the toggle to secure said plates in assembled relation.

10. A latching device as claimed in claim 9, said means to removably secure said anchor pin shanks in one of said plates comprising an annular groove in each shank and a resilient spring ring mounted in said groove and having a normal free diameter slightly larger than the diameter of said shank.

References Cited in the file of this patent

UNITED STATES PATENTS

| | | |
|---|---|---|
| 2,133,558 | Miller | Oct. 18, 1938 |
| 2,370,354 | Hurst | Feb. 27, 1945 |
| 2,643,139 | Hamilton | June 23, 1953 |